Patented Sept. 26, 1922.

1,430,324

UNITED STATES PATENT OFFICE.

WORTH H. RODEBUSH, OF BALTIMORE, MARYLAND, ASSIGNOR TO U. S. INDUSTRIAL ALCOHOL CO., A CORPORATION OF WEST VIRGINIA.

PROCESS OF MAKING ESTERS.

No Drawing.   Application filed May 8, 1919. Serial No. 295,748.

*To all whom it may concern:*

Be it known that I, WORTH H. RODEBUSH, a citizen of the United States, residing at Baltimore and State of Maryland, have invented a certain new and useful Improvement in Processes of Making Esters, of which the following is a specification.

My invention relates particularly to a process of producing esters, but has reference especially to the production of glycol acetate and homologous compounds.

The object of my invention is to provide a process by means of which glycol acetate and homologous compounds may be made in an advantageous manner. Another object of my invention is to provide a process by means of which high yields may be obtained. Another object is to provide a process in which the product is produced under pressure in ethyl alcohol.

Further objects of my invention will appear from the detailed description thereof set forth hereinafter.

While my invention is capable of being carried out in many different ways, for the purpose of illustration I shall describe only certain ways of carrying out the same hereinafter.

For example, in carrying out my invention, assuming that glycol acetate is to be made, 100 parts by weight of ethylene dichloride and 150 parts by weight of fused potassium acetate are added to from 150 to 200 parts by weight of ethyl alcohol, having a strength of 95% in a closed vessel at a pressure of 150 pounds per square inch. The temperature of the contents is raised in any suitable manner to 180° C., and at this temperature the reaction will be completed within approximately one hour. After the reaction has been completed, the potassium chloride which has separated or crystallized out is filtered off, and the glycol acetate and alcohol are separated from each other by fractional distillation.

Instead of the ethylene dichloride being used, the corresponding chlorinated hydrocarbons obtained from butylene or amylene may be used. Again, instead of the potassium acetate the acetates of sodium, calcium or magnesium may be used. Again, instead of the acetates of such compounds, the corresponding salts of other fatty acids may be used, such for example as salts of propionic or butyric acids. Also the temperature may, if desired, range from 160° C. to 180° C.

While I have described my invention above in detail, I wish it to be understood that many changes may be made therein without departing from the spirit thereof.

I claim:

1. A process which comprises producing an ester by heating between 160 and 180° C. under pressure ethylene dichloride and a salt of a fatty acid in the presence of ethyl alcohol.

2. A process which comprises producing an ester by heating between 160 and 180° C. under pressure ethylene dichloride and an acetate in the presence of ethyl alcohol.

3. A process which comprises producing an ester by heating between 160 and 180° C. under pressure ethylene dichloride and an acetate in the presence of an alcohol.

4. A process which comprises producing an ester by heating between 160 and 180° C. under pressure ethylene dichloride and an acetate in the presence of ethyl alcohol, and then filtering off the salt formed in the reaction.

5. The process which comprises producing an ester by heating between 160 and 180° C. under pressure ethylene dichloride and an acetate in the presence of ethyl alcohol, then filtering off the salt formed in the reaction, and separating the ester from the alcohol by fractional distillation.

6. The process of producing an ester comprising heating between 160 and 180° C. under a pressure of about 150 lbs. per sq. in. ethylene dischloride and a salt of a fatty acid in the presence of ethyl alcohol.

7. The process of producing an ester comprising heating between 160 and 180° C. under a pressure of about 150 lbs. per. sq. in. ethylene dichloride and an acid in the presence of ethyl alcohol, filtering off the salt formed in the reaction, and separating the ester from the alcohol by fractional distillation.

In testimony that I claim the foregoing, I have hereunto set my hand this 1st day of May, 1919.

WORTH H. RODEBUSH.